Nov. 1, 1966  F. BUFF ET AL  3,282,415

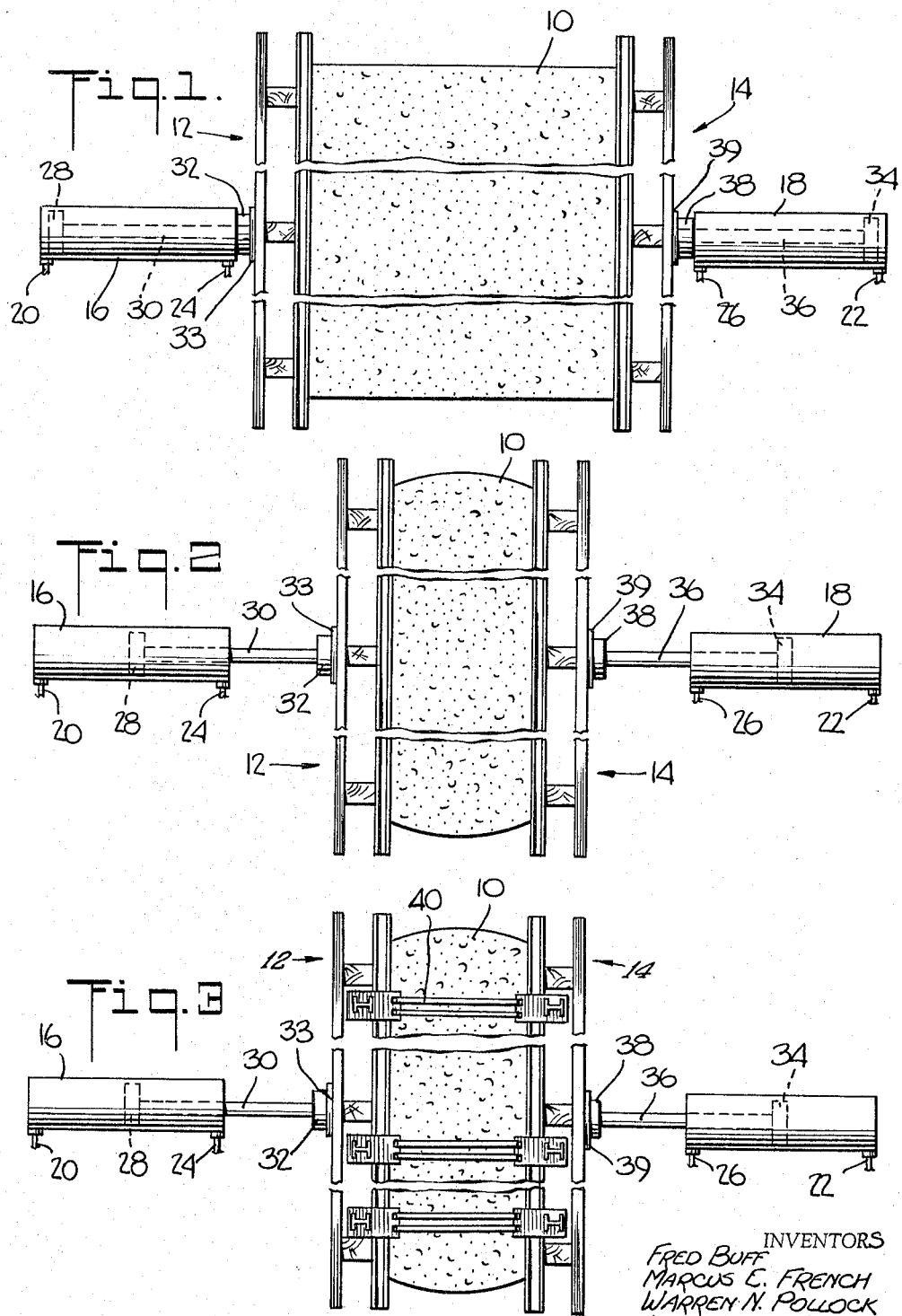

EXPANDED CELLULAR PRODUCTS

Filed June 1, 1964  4 Sheets-Sheet 2

INVENTORS
FRED BUFF
MARCUS E. FRENCH
WARREN N. POLLOCK
MICHAEL A. RICCIARDI

BY Ward, Neal Haslton, McElhannon, Owen, Brooks & Fitzpatrick
ATTORNEYS

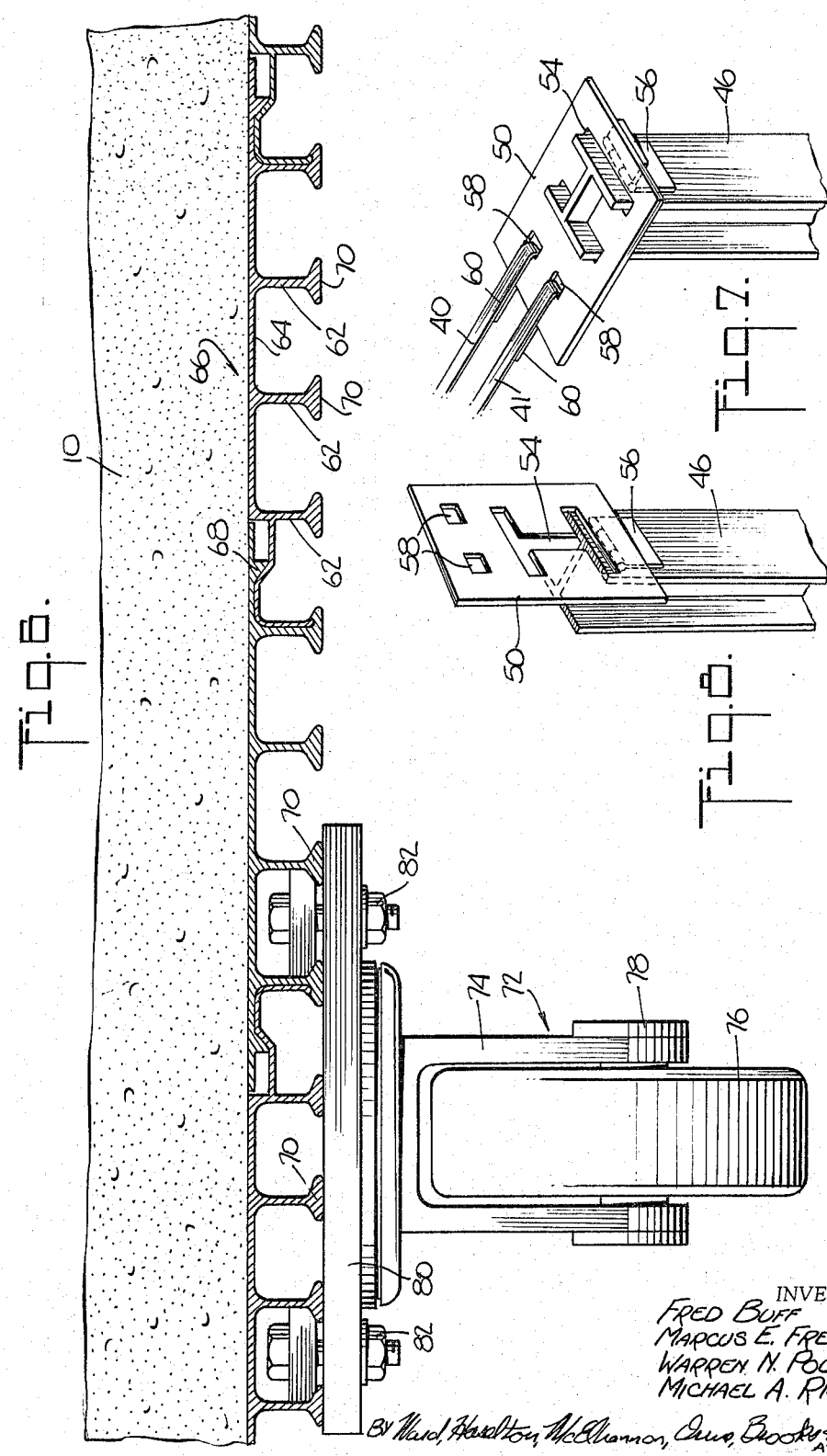

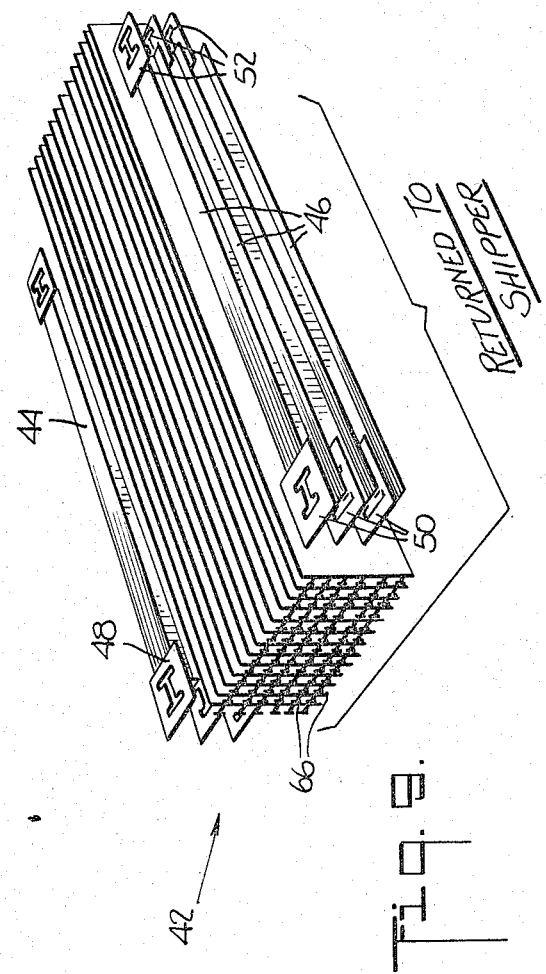

United States Patent Office

3,282,415
Patented Nov. 1, 1966

3,282,415
EXPANDED CELLULAR PRODUCTS
Fred Buff, Paramus, N.J., and Marcus E. French, Hazleton, and Warren N. Pollock and Michael A. Ricciardi, Conyngham, Pa., assignors to General Foam Corporation, New York, N.Y., a corporation of New York
Filed June 1, 1964, Ser. No. 371,607
7 Claims. (Cl. 206—83.5)

This invention relates to expanded cellular products and more particularly to a method and apparatus for preparing an expanded cellular product for transportation.

The method and apparatus for preparing expanded cellular material for transit in accordance with the concept of this invention is adapted, among other possible uses, for use with polyurethane foam used in the manufacture of furniture, cushions, pillows and toys, for example. The invention is particularly adaptable for use with expanded cellular material where relatively large unit volumes of material having low specific density are being shipped.

It is the general practice, in the manufacture and processing of expanded cellular products, such as, polyurethane foam, for example, to manufacture the foam and actually expanded it at the place of manufacture because the special facilities are conveniently kept at such location. Heretofore, the expanded cellular product was packaged in its expanded form and shipped by freight means. In practice such a procedure was expensive and particularly undesirable when the foam material being shipped was relatively inexpensive per unit volume, so that the shipping costs appeared as a high percentage of the total cost of the material. Hence, the freight costs were relatively high due to the large volume of valuable shipping or freight space required. Particularly in the later instance, it became necessary to locate the manufacturing facilities close to the ultimate market in order to meet the local competitior's prices. This, in turn, had several disadvantages. Firstly, full benefit could not be derived from high quantity mass production techniques and facilities. Secondly, it usually meant that the production facilities had to be located in urban areas where the production costs were higher. As a result, the prior art manufacturing facilities were undesirably small and disposed in undesirable locations.

It is an object of this invention to overcome the aforementioned difficulties in a new and practical manner.

A feature of this invention resides in a new and improved method of preparing an expanded cellular product for transportation which substantially increases the bulk density of the material being shipped and therefore substantially reduces its unit volume.

Another feature of this invention is a reduction in the amount of packaging material required to protect and contain the material during transit. This reduces the cost of the packaging material.

In addition a feature of this invention is the reduction in the unit volume of material to be shipped. Since expanded cellular material is of low density, standard freight cars or trucks are limited by the volume they can carry rather than the weight of material they can handle. It has been found that according to the concept of this invention that a given freight car can carry a substantially greater weight of expanded cellular material, and hence the shipping costs are substantially reduced.

Yet another feature of the present invention resides in a new and improved method of preparing an expanded cellular product for transportation which is easier to handle during preparation for shipment, during transit, and during unloading at its destination. As an additional advantage, the material is less likely to be damaged or injured during handling and during transit. These advantages result in a more economical operation.

Another feature of the present invention resides in a novel method of preparing an expanded cellular product for transportation which actually produces a much superior product itself. This is particularly true with polyurethane foam, or the like material.

A further advantage of this invention is the expansion of the consumer market that can be supplied from a given manufacturing facility. This provides increased manufacturing economies and provides flexibility to meet changing demands in various consumer areas.

An aspect of this invention resides in the provision of a new and improved shipping pallet in which expanded cellular products may readily be placed and from which the cellular products may be readily removed. This simplifies and expedites the shipping procedure.

Another aspect of the present invention is the provision of a shipping pallet which has high strength and low weight characteristics.

Still another aspect herein resides in a pallet which may be disassembled into small components at the point of destination and returned to the original manufacturers plant for reuse. Moreover, the pallet according to the invention not only protects the expanded cellular material during handling, storage and transit, but it also actually contains the material in such a way that it actually improves the product. Besides, the pallet structure is such that it may be employed and coordinated with the manufacturing process.

In addition, the pallet according to this invention may incorporate removeable wheels to simplify the handling. The pallets may be stacked one on top of the other and the bottom pallet may readily be equipped with wheels for purposes of ease in moving and handling.

In order to achieve the aforementioned features, objects, advantages and aspects, this invention contemplates the provision of a new and improved method of preparing an expanded cellular product for transportation including taking an elongated cured cellular product and positioning such product between a pair of opposed, relatively-movable, rigid surfaces. Thence, the surfaces are moved relatively one with respect to the other to reduce the volume of the product so disposed therebetween. Subsequently, the surfaces are secured in the so moved position to retain such position during transit of the product.

According to one form of this invention, a shipping pallet is provided for transporting an expanded cellular product including a pair of opposed relatively-movable rigid surfaces. A plurality of reinforcing members are positioned transversely of and in engagement with the surfaces. A plate is disposed at each end of the reinforcing members adjacent the edge of the surface. Connecting means are provided for interconnecting the plates associated with one surface with the corresponding plates of the other surface, respectively. In one form of the invention the plate is hingedly connected to the reinforcing member and strap means are used for interconnecting the plate associated with one surface with the corresponding plate of the other surface. In this manner the cellular product is retained in compression between the surfaces for an extended period of time during transit and during handling.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is an end elevation of an expanded cellular product positioned between a pair of opposed, relatively-movable, rigid surfaces according to the concept of this invention;

FIG. 2 is an end elevation similar to FIG. 1, but at a time subsequent to the moving of one surface with respect to the other to reduce the volume of the expanded cellular product disposed therebetween;

FIG. 3 is an end elevation similar to FIGS. 1 and 2, but at a time subsequent to the positioning of strap means for retaining the surfaces in their contracted position to retain the cellular product disposed therebetween in a compressed form;

FIG. 6 is an enlarged sectional view taken along the line 6—6 of FIG. 5 and showing details of the rigid surfaces and the caster means;

FIG. 7 is an enlarged perspective view showing details of the bearing plate and the means for attaching same;

FIG. 8 is an enlarged perspective view of the bearing plate similar to FIG. 7, but disposed in a different position; and FIG. 9 is a perspective view of the shipping pallet in a collapsed condition ready for return to the original shipper.

Figure 4:
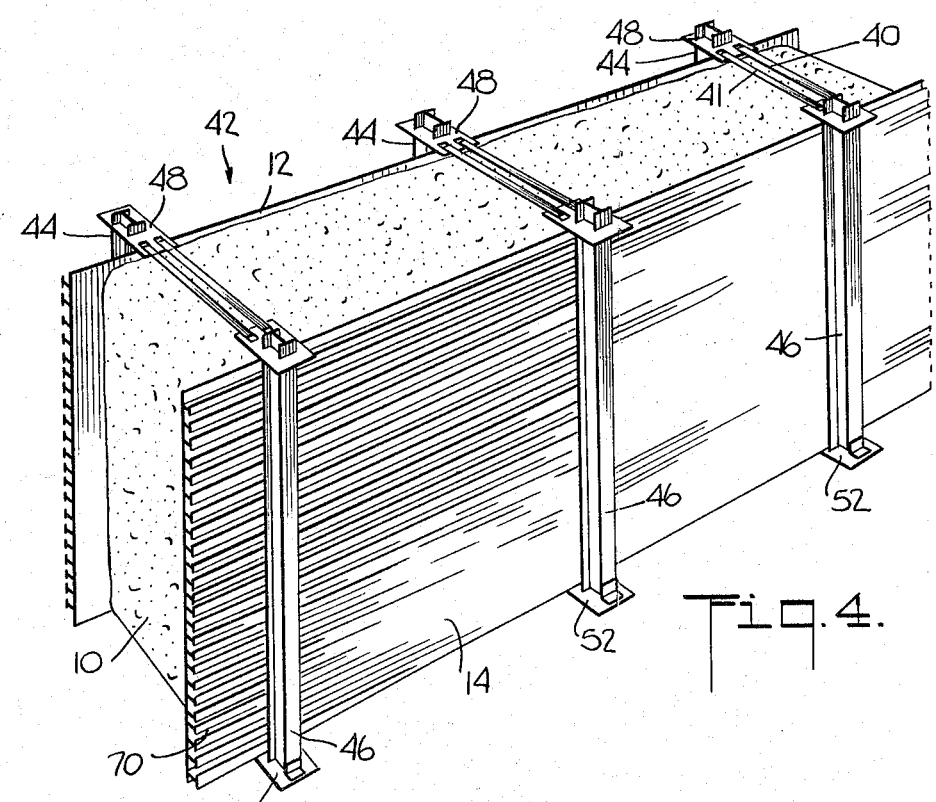
FIG. 4 is a perspective view of a shipping pallet containing an expanded cellular bun in compressed form according to the concept of the present invention.

In the illustrated embodiment of the invention, a bun of cellular material 10 is received from a source in an expanded condition. Such cellular material may be polyurethane, for example. The material 10 is positioned between a pair of opposed, rigid surfaces designated generally at 12 and 14 in FIGS. 1–3, inclusive. The surfaces 12 and 14 are movable one with respect to the other for purposes of compressing the material 10 therebetween. Such movement is provided by means of fluid cylinders 16 and 18 which are provided with fluid inlets 20 and 22, respectively, which inlets receive fluid from a source (not shown). Cylinders 16 and 18 are also provided with outlets 24 and 26, respectively. The fluid cylinder 16 is adapted to receive a piston 28 to which is connected one end of a piston rod 30, the other end of piston rod 30 being fixedly connected to a member 32 which frictionally engages the surface 12 as at 33 (FIGS. 1–3, inc.). Similarly cylinder 18 is adapted to receive a piston 34, which is connected to piston rod 36 having one end thereof fixedly connected to a member 38 which frictionally engages the surface 14 as at 39.

In operation the bun of cellular material 10 is positioned between the surfaces 12 and 14 as shown in FIG. 1. The outlets 24 and 26 of the fluid cylinders 16 and 18 are opened and fluid is directed into the cylinders through the inlets 20 and 22, respectively. This moves the pistons 28 and 34 inwardly which in turn moves the surfaces 12 and 14 relatively towards each other and thereby reduces the volume of the expanded cellular material to the condition as illustrated in FIG. 2. It will be appreciated that instead of providing fluid cylinders for each surface 12 and 14, one or the other cylinder could be eliminated and the corresponding surface could be retained in a fixed position while the other surface is mounted for movement. In this manner movement of one surface with respect to the other surface could be achieved. It has been found that the material 10 may be compressed to reduce its volume from about 25 percent to about 95 percent of its expanded condition. However, preferably the volume reduction is from about 50 percent to about 90 percent of its expanded condition.

As best seen in FIG. 3, after the material 10 has been compressed, strap means designated generally at 40 are connected between the surfaces 12 and 14 to thereby retain the product in its compressed condition. The inlets 20 and 22 of the fluid cylinders 16 and 18 are opened and fluid is directed into the outlets 24 and 26 of said cylinders to move the pistons 28 and 34, the piston rods 30 and 36, to disengage the members 32 and 38 from the surfaces 12 and 14. The surfaces and the cellular material contained therebetween are in the form as shown in FIG. 4 and they remain essentially in this form during transit.

Referring now to FIG. 4, there is shown a shipping pallet designated generally at 42 comprising the rigid surfaces 12 and 14, a plurality of reinforcing members or I-shaped beams 44 and 46, bearing plates 48, 50 and 52, and straps 40. The I-shaped reinforcing beams 46 are disposed transversely of and in engagement with the surface 14, and likewise beams 44 are disposed transversely of and in engagement with the surface 12. Bearing plates 50 and 52 are disposed at each end of the I-shaped reinforcing beams 46, respectively, and likewise bearing plates are disposed at each end of the beams 44 (only one end being shown at 48, FIG. 4).

It will be appreciated that each of the bearing plates 48, 50 and 52 are of similar construction and perform in a similar manner, and therefore only one bearing plate 50 will be discussed in detail. As best seen in FIGS. 7 and 8, the bearing plate 50 has a substantially I-shaped cut-out 54 for receiving the I-shaped reinforcing beam 46. The bearing plate 50 is hingedly connected to the beam 46 as by means of hinge member 56, FIG. 7 showing the bearing plate 50 in its operating position wherein the beam 46 rests or bears on the inside surface of the cut-out 54, as shown. FIG. 7 shows the components in the positions assumed during transit of the shipping pallet when it contains the cellular product. FIG. 8 shows the bearing member 50 in its folded condition wherein it is disposed in parallel relationship with respect to the beam 46. The position of the components as illustrated in FIG. 8 is their respective positions when the shipping pallet has been collapsed and is being returned to the original shipper.

Referring back to FIG. 4, strap means 40 are provided for interconnecting the bearing plates associated with one surface with the corresponding bearing plates associated with the other surface, respectively. It is noted that only the straps connecting bearing plates 48 and 50 are shown. Preferably two parallel straps as illustrated at 40 and 41 are employed for strength and safety purposes. As best seen in FIGS. 7 and 8 the bearing plate 50 is provided with cut-outs 58 for receiving the end portions of the straps 40 and 41, the end portions being adapted to pass through the openings and be crimped as at 60 to thereby fixedly attach the straps to the bearing plates.

Referring now in further detail to the construction of the surfaces 12 and 14, it will be appreciated that the surfaces are identical and therefore only surface 14 will be described in detail. As best seen in FIG. 6, the surface 14 comprises a plurality of parallelly disposed substantially I-shaped beams 62 which are interconnected by one flange 64 to form a group 66 including four I-shaped beams, for example. Each group 66 is connected, as by interlocking means 68, to the next adjacent group in order to form the entire flat, rigid surface. The other flange 70 of the I-shaped beam 62 receives in engagement the reinforcing beam 46 as shown in FIG. 4.

Figure 5:
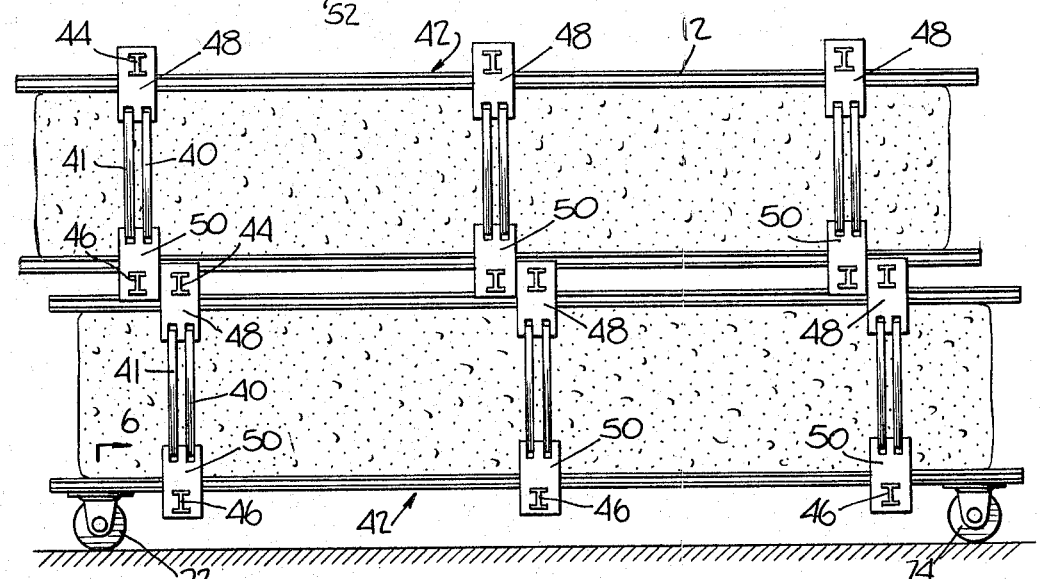
FIG. 5 is a side elevation of a plurality of shipping pallets in stacked position with the lowermost pallet having casters.

Referring next to FIG. 5, there is shown a plurality of shipping pallets 42 in stacked relationship, one on top of the other for purposes of handling, storage or transit. It should be appreciated that the bearing plates 48 and 50 are disposed in staggered relationship one with respect to the other in order to prevent slipping and to provide stability to a column of pallets so disposed.

Still referring to FIG. 5, the lowermost pallet 42 is provided with four casters, two being shown at 72 and 74, caster 72 being of the fixed type and caster 74 being of the swivel type. The casters increase the mobility of the pallets and lend ease in the handling thereof.

Further mechanical details will now be described regarding the connection of the casters to the surface 14 as shown in FIG. 6. The caster 72 is provided with a body 74, a wheel 76, and an axle 78 which rotatably mounts the caster on the body. The upper portion of the body 74 is provided with a flange 80 which is adapted to engage the flange 70 of the I-shaped beams 62. Bolt means 82 having an enlarged head portion removably secure the flange 80 to the flange 70, as shown in FIG. 6. The casters 72 and 74 (FIG. 5) may be removed or retained in place during transit, as desired.

The pallet 42 may be disassembled into small components at the point of destination and returned to the original manufacturer's plant for reuse. Referring to FIG. 9 there is shown a pallet 42 in its disassembled form. The straps have been severed and removed, and the cellular material has been removed. The reinforcing beams 44 and 46 have been removed and the bearing plates 48, 50 and 52 have been rotated (FIG. 8) to their flattened position. Each group 66 (FIG. 9) has been disengaged from its adjacent group so that they may be stacked one against the other in order to provide a small compact package to be returned to the shipper. It has been found desirable to manufacture the shipping pallet substantially from aluminum material because of its desirable combination of weight and strength properties.

There has thus been described in detail a highly desirable method and apparatus for preparing an expanded cellular product for transportation.

Although particular embodiments of the invention are herein disclosed for purposes of explanation, further modifications thereof after study of this specification, will be apparent to those skilled in the art to which the invention pertains. Reference should accordingly be had to the appended claims in determining the scope of the invention.

What is claimed and described to be secured by Letters Patent is:

1. A shipping pallet for transporting an expanded cellular product comprising a pair of opposed relatively-movable rigid surfaces, a plurality of reinforcing members disposed transversely of and in engagement with said surfaces, a plate disposed at each end of said reinforcing members adjacent the edge of the surface, severable connecting means fixedly attached to and interconnecting the plates associated with one surface with the corresponding plates of the other surface, respectively, whereby said cellular product is retained in compression between said surfaces.

2. A shipping pallet for transporting an expanded cellular product comprising a pair of parallelly disposed relatively-movable rigid surfaces, a plurality of reinforcing members disposed transversely of and in engagement with said surfaces, a bearing plate disposed at each end of said reinforcing members adjacent the edge of the surface, said plate being hingedly connected to said reinforcing member, severable strap means fixedly attached to and interconnecting the bearing plates associated with one surface with the corresponding bearing plates of the other surface, respectively, whereby said cellular product is retained in compression between said surfaces.

3. A shipping pallet for transporting an expanded cellular product comprising a pair of opposed relatively-movable rigid surfaces, a plurality of reinforcing members disposed transversely of and in engagement with said surfaces, a bearing plate disposed towards each end of said reinforcing members, said plate being hingedly connected to said reinforcing member, severable strap means interconnecting the bearing plates associated with one surface with the corresponding bearing plates associated with the other surface respectively, said strap means being fixedly attached to said bearing plates subsequent to the positioning of said expanded cellular product between said surfaces and said strap means being adapted to urge said surfaces one towards the other to retain said cellular product in compression therebetween.

4. A shipping pallet for transporting an expanded cellular product comprising a pair of opposed relatively-movable rigid surfaces, a plurality of substantially I-shaped reinforcing means disposed transversely of and in engagement with said surfaces, a bearing plate disposed towards each end of said I-shaped reinforcing beam, said bearing plate having a substantially I-shaped cut-out for receiving said I-shaped reinforcing beam, hinge means interconnecting said I-shaped reinforcing beams with said bearing plates respectively, severable strap means interconnecting the bearing plates associated with one surface with the corresponding bearing plates associated with the other surface respectively, said bearing plates being provided with a plurality of cut-outs for receiving the end portions of said strap means, said end portions being adapted to pass through said openings and be crimped thereby fixedly attaching said strap means to said bearing plates.

5. A shipping pallet for transporting an expanded cellular product comprising a pair of opposed relatively-movable rigid surfaces, each of said surfaces comprising a plurality of parallelly disposed substantially I-shaped beams having a flange portion of each beam abutting the flange portion of the adjacent beam for forming a substantially complete surface, means releasably interconnecting said beams, a plurality of reinforcing members disposed transversely of and in engagement with said surfaces, a bearing plate disposed towards each end of said reinforcing members, said plate being hingedly connected to said reinforciing member, severable strap means interconnecting the bearing plates associated with one surface with the corresponding bearing plates associated with the other surface respectively, said strap means being fixedly attached to said bearing plates subsequent to the positioning of said expanded cellular product between said surfaces and said strap means being adapted to urge said surfaces one towards the other to retain said cellular product in compression therebetween.

6. A shipping pallet for transporting an expanded cellular product comprising a pair of opposed relatively-movable rigid surfaces, each of said surfaces comprising a plurality of parallelly disposed substantially I-shaped beams having a flange portion of each beam abutting the flange portion of the adjacent beam for forming a substantially complete surface, means releasably interconnecting said beams, a plurality of casters, means mounting said casters on the other flange portion of said I-shaped beams, a plurality of reinforcing members disposed transversely of and in engagement with said surfaces, a bearing plate disposed towards each end of said reinforcing members, said plate being hingedly connected to said reinforcing member, severable strap means interconnecting the bearing plates associated with one surface with the corresponding bearing plates associated with the other surface respectively, said strap means being fixedly attached to said bearing plates subsequent to the positioning of said expanded cellular product between said surfaces of said strap means being adapted to urge said surfaces one towards the other to retain said cellular product in compression therebetween.

7. A shipping pallet for transporting an expanded cellular product comprising a pair of parallelly disposed relatively-movable rigid surfaces, a pair of opposed relatively-movable rigid surfaces, each of said surfaces comprising a plurality of parallelly disposed substantially I-shaped beams having a flange portion of each beam abutting the flange portion of the adjacent beam for forming a substantially complete surface, means releasably interconnecting said beams, a plurality of casters, means mounting said casters on the other flange portion of said I-shaped beams, a plurality of substantially I-shaped reinforcing beams disposed transversely of and in engagement with said surfaces, a bearing plate disposed towards each end of said I-shaped reinforcing beam, said bearing plate having a substantially I-shaped cut-out for receiving said I-shaped reinforcing beam, hinge means interconnecting said I-shaped reinforcing beams with said bearing plates respectively, severable strap means interconnecting the bearing plates associated with one surface with the corresponding bearing plates associated with the other surface respectively, said bearing plates being provided with a plurality of cut-outs for receiving the end portions of said strap means, said end portions being adapted to pass through said openings and be crimped thereby fixedly attaching said strap means to said bearing plates, said strap means being fixedly attached to said bearing plates subsequent to the positioning of said expanded cellular product between said surfaces and said strap means being adapted to urge said surfaces one towards the other to retain said cellular product in compression therebetween.

References Cited by the Examiner
UNITED STATES PATENTS

| | | | |
|---|---|---|---|
| 1,550,745 | 8/1925 | Rehman | 217—36 |
| 1,669,214 | 5/1928 | Schulz | 206—60 |
| 1,846,949 | 2/1932 | Clark | 206—83.5 |
| 1,920,841 | 8/1933 | Clark | 206—83.5 |
| 1,948,615 | 2/1934 | Clark | 53—24 |
| 2,114,892 | 4/1938 | Vaughn | 206—46 |
| 2,413,556 | 12/1946 | Fourness et al. | 53—24 |
| 2,659,935 | 11/1953 | Hammon. | |
| 3,189,669 | 6/1965 | Foldfein | 264—321 |

FOREIGN PATENTS 879,461  10/1961  Great Britain.

THERON E. CONDON, Primary Examiner.

LOUIS G. MANCENE, Examiner.

W. T. DIXSON, Assistant Examiner.